(12) United States Patent
Curtis (10) Patent No.: US 6,360,365 B1
(45) Date of Patent: Mar. 19, 2002

(54) SYSTEM, METHOD, AND PROGRAM FOR PRESERVING BACKGROUND SETTINGS DURING INSTALL AND UNINSTALL OPERATIONS

(75) Inventor: Bryce Allen Curtis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,374

(22) Filed: Mar. 29, 1999

(51) Int. Cl.[7] .............................................. G06F 9/445
(52) U.S. Cl. ........................ 717/11; 345/765; 345/772
(58) Field of Search ............................ 717/11; 345/705, 345/709, 765, 771, 772, 808

(56) References Cited

U.S. PATENT DOCUMENTS

| | | | | |
|---|---|---|---|---|
| 5,737,557 A | * | 4/1998 | Sullivan | 345/765 |
| 5,953,532 A | * | 9/1999 | Lochbaum | 717/11 |
| 6,100,887 A | * | 8/2000 | Bormann et al. | 345/339 |
| 6,182,285 B1 | * | 1/2001 | Bleizeffer et al. | 717/11 |
| 6,205,432 B1 | * | 3/2001 | Gabbard et al. | 705/14 |
| 6,297,819 B1 | * | 10/2001 | Furst | 345/329 |

OTHER PUBLICATIONS

Indigo Rose Software Design Corp. "Setup Factory 4.0" User's Guide, 1998.

* cited by examiner

*Primary Examiner*—Tuan Q. Dam
(74) *Attorney, Agent, or Firm*—Konrad Raynes Victor & Mann LLP; David W Victor; Alan S Raynes (57) ABSTRACT

Disclosed is a method, system, program, and data structure for managing background display information being installed on a computer system. Certain embodiments include at least one file set including install objects to install a computer program. The install objects include a graphics object containing background display information relating to the program. The install objects are processed to install the computer program, and the graphics object is processed to display the background display information on a display monitor. A copy of the graphics object is stored to a memory location, and the copy of the graphics file is maintained in the memory location after the program is installed onto the computer. Embodiments may also include a file set having uninstall objects to uninstall the computer program. The uninstall objects are processed to uninstall the computer program, and the copy of the graphics object stored in the memory location is processed to display the background display information on the monitor during uninstall.

30 Claims, 5 Drawing Sheets

SYSTEM, METHOD, AND PROGRAM FOR PRESERVING BACKGROUND SETTINGS DURING INSTALL AND UNINSTALL OPERATIONS

CROSS-REFERENCE TO RELATED APPLICATIONS

This application is related to the following co-pending and commonly-assigned patent applications, which applications were filed on the same date herewith, and which applications are incorporated herein by reference in their entirety:

"A Cross-Platform Program, System, and Method Having a Global Registry Object for Mapping Registry Equivalent Functions in an AIX Operating System Environment," having application Ser. No. 09/280,345;

"A Cross-Platform Program, System, and Method Having a Global Registry Object for Mapping Registry Equivalent Functions in an OS/2 Operating System Environment," having application Ser. No. 09/280,350;

"A Cross-Platform Program, System, and Method Having a Global Registry Object for Mapping Registry Functions in a Windows Operating System Environment," having application Ser. No. 09/280,349;

"Global Registry Object for Mapping Registry Functions and Registry Equivalent Functions Across Multiple Operating Systems in a Cross-platform Program," having application Ser. No. 09/280,371;

"A Cross-platform Program, System, and Method Having a System Independent Registry for Use on Operating Systems Irrespective of a Registry Equivalent," having application Ser. No. 09/280,368;

"Cross Platform Installer with the ability to Create Platform Independent Variable of Specific Operating System Variables from a Scripting Language," having application Ser. No. 09/280,344, now U.S. Pat. No. 6,269,480;

"A System, Method, and Program for Overriding Program Properties," having application Ser. No. 09/280,346;

"A System, Method and Program for Providing an Object-Oriented Install Architecture," having application Ser. No. 09/280,352;

A System, Method, and Program for Automatic Error Detection While Utilizing a Software State Machine for Carrying out the Process Flow of a Software Program, having application Ser. No. 09/280,375;

A System, Method, and Program for Utilizing a Software State Machine for Carrying Out the Process Flow of a Software Program, having application Ser. No. 09/280,376;

A System, Method, and Program for Enabling a Software Program to Automatically Select a System-dependent Function, having application Ser. No. 09/280,369;

A System, Method, and Program for Mapping a Global Object to Desktop Elements of Different Operating Systems, having application Ser. No. 09/280,372;

A System, Method, And Program For Processing Dependencies Using a Dependency Object, having application Ser. No. 09/280,370;

A System, Method, and Program for Modifying a Text File, having application Ser. No. 09/280,348;

A System, Method, and Program for Updating Registry Objects With a Cross-platform Installation Program, having application Ser. No. 09/280,351;

A System, Method, And Program for Modifying a Library Object, having application Ser. No. 09/280,347;

A System, Method, And Program For Installation on Drives Using a Drive Object, having application Ser. No. 09/280,353; and A System, Method, and Program for Performing Program Specific Uninstall Operations, having application Ser. No. 09/280,373.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a method, system, and program for managing and preserving background display settings during install and uninstall operations.

2. Description of the Related Art

An installer program is a software program that enables a programmer to write specific code to install a given application program onto the drives of a computer in a way that enables the given application program to work correctly with the computer's environment, including its operating system. There are several types of installers—Java installers and operating system specific installers, e.g., Microsoft Windows installers, and International Business Machines ("IBM") OS/2 and AIX operating system installers, etc. Many of the install programs existing today have various limitations in their functionality as discussed below.

One type of Java installer is provided by a software company known as InstallShield. Currently, the functionality and configurability of this Java installer is somewhat limited. For example, the Java installer provides default panels, but the text cannot be changed or configured. Also, this Java installer is not easy to customize. In other words, a programmer cannot easily add a function that is not provided by the installer program. In addition, the current Java installer provides only limited registry support. A registry is a central repository for all possible information for the computer such as hardware configurations and software settings, etc. The registry maintains information on installed components. A programmer or user can access the registry to determine information about installed products, based upon what the user/programmer placed into the registry or what information is useful to the user. Presently, the Java installer only works with a Microsoft Windows' registry; and the support provided with Microsoft Windows is limited. For example, the current Java installer does not enable the Windows' system registry to be updated directly. Instead, the keys to update in the registry are in a file which must be imported into the registry through a system call. It would be desirable if such a Java installer program supported multiple directories, splash screens (which are images that come up while a software product is being installed), and multiple languages instead of only English. Furthermore, it would be desirable for a given installer program to be more broadly applicable to other environments and operating systems. Although InstallShields' Java installer is tailored to Java, it is also geared somewhat for the Windows' operating system as discussed above in terms of the Windows' registry support provided. However, it does not provide specific support for other operating systems such as the IBM OS/2 and AIX operating systems.

Another Java installer is called "Install Anywhere" from ZeroG. This Java installer program also has a default panel that is not configurable, e.g., the order in which panels appear is not customizable. Likewise, registry support is limited. A user/programmer updates a registry from a file using a "reg_edit" command. Although this installer program enables a user/programmer to add a few items into the registry, the registry cannot be queried. In addition, other registry functional features are not available. Likewise, there is no multiple directory support, and no national language support. Also, it does not support multiple operating systems, i.e., there is no OS/2 or AIX specific support.

Another approach would be to provide install APIs for Java. However, this approach is not yet available.

With respect to operating system specific installers, InstallShield provides a Microsoft Windows' 32 installer, e.g., Microsoft Windows 95/98 and NT. Although this installer program is widely used throughout the industry, it is based upon a proprietary scripting language developed by InstallShield. The scripting language is similar to Basic programming language. Programmers, who generally have experience and knowledge of object oriented programs such as C++ and Java, must learn this proprietary InstallShield script, which is not related to the popular computer languages, in order to program an Install program. This unfamiliarity with the proprietary InstallShield scripting language complicates the installer programming process.

During an installation of a computer program, a background panel often appears displaying a background color, information on the product being installed, and other images. However, during uninstallation, an entirely different panel is displayed, often not containing information on the product being uninstalled. Further, during the uninstall process, a user may typically view a dialog box requesting user action without information on the product being uninstalled. As a result, the user may be confused on the identity of the program being uninstalled. Thus, it would be desirable to have a recognizable interface during uninstall to lessen the possibility of inadvertently uninstalling the wrong product.

SUMMARY OF THE PREFERRED EMBODIMENTS

To overcome the limitations in the prior art described above, preferred embodiments disclose a system, method, program, and data structure for managing background display information in a program being installed on a computer system. In one embodiment, a copy of the background display information is stored in a memory location. A copy of the background display information is maintained in the memory location after the program is installed onto the computer. The copy of the graphics object stored in the memory location is processed to display the background display information during uninstall.

In another embodiment, at least one file set including install objects to install a computer program is provided. The install objects include a graphics object containing background display information relating to the program. The install objects are processed to install the computer program, and the graphics object is processed to display the background display information on a display monitor. A copy of the graphics object is stored to a non-volatile memory location, and the copy of the graphics file is maintained in the memory location after the program is installed onto the computer.

In further embodiments, the computer program also includes a file set having uninstall objects to uninstall the computer program. The uninstall objects are processed to uninstall the computer program, and the background display information is displayed on the monitor during uninstall.

In yet another embodiment, the install objects also include a second graphics object containing additional background information. A copy of the second graphics object is stored to a non-volatile memory location. The copy of the second graphics file is maintained in the memory location after the program is installed onto the computer.

Preferred embodiments provide the user with a familiar background display when uninstalling a program because during uninstall the same background information is displayed that was present during installation. This reduces the likelihood that the user will inadvertently uninstalling the wrong program, because it permits the user, during the uninstallation process, to observe the background information for the product and confirm that the desired program is being uninstalled.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
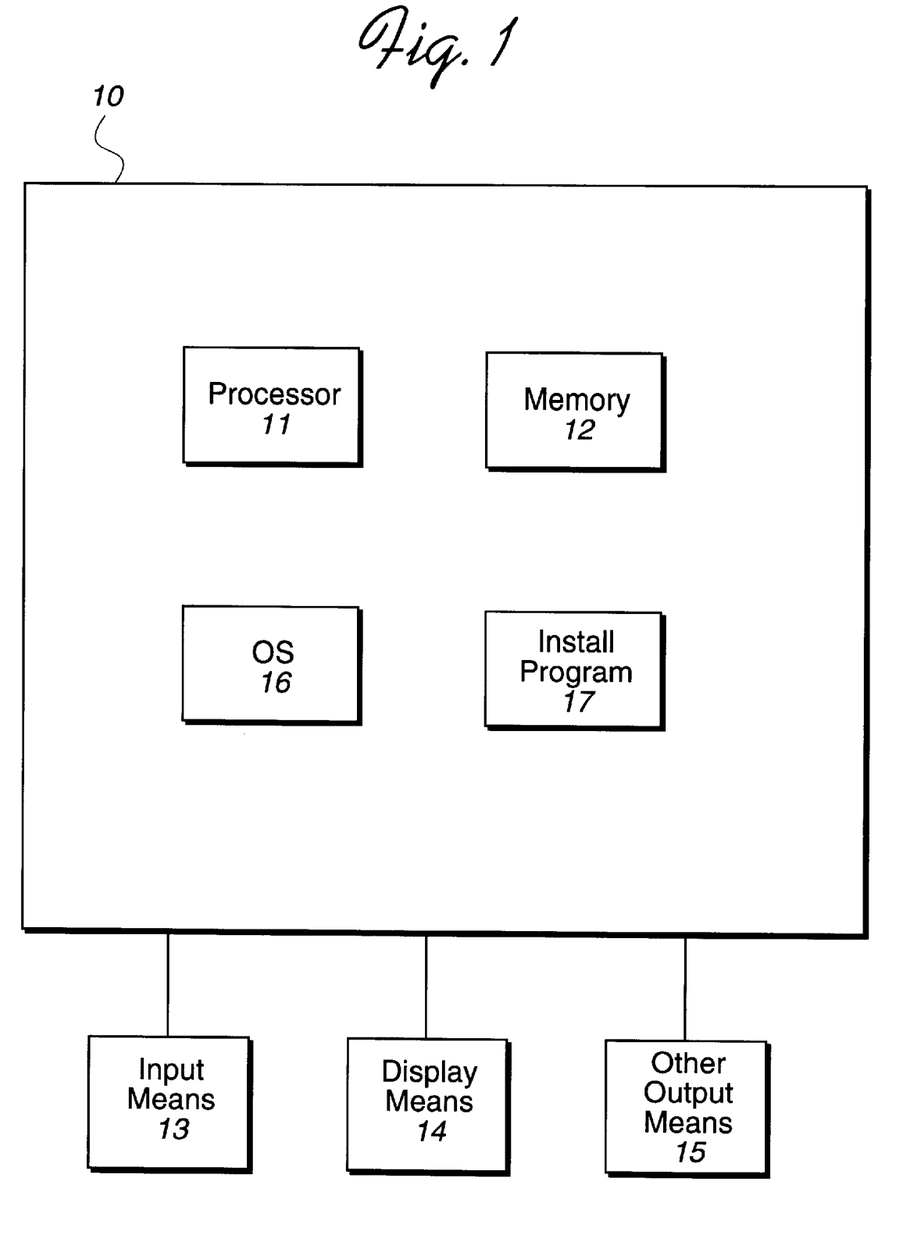
FIG. 1 is a block diagram illustrating a software and hardware environment in which preferred embodiments of the present invention are implemented.

With reference to FIG. 1, a block diagram of a data processing system 10, i.e., computer system, in which a preferred embodiment of the present invention may be implemented is depicted. The computer includes a processor 11 and memory 12. The computer 10 may be, but is not limited to, a personal computer, workstation, or a mainframe. The computer system also includes input means 13 such as a keyboard and/or mouse and/or track ball and/or light pen and/or pen-stylus and/or voice-sensitive device and/or touch-sensitive device, and/or other pointing devices and/or other input means. Also included are display means 14 such as a display monitor and other output means 15 such as printers, etc. Memory 12 includes volatile or nonvolatile storage and/or any combination thereof. Volatile memory may be any suitable volatile memory device known in the art, e.g., RAM, DRAM, SRAM, etc. Nonvolatile memory may include storage space, e.g., via the use of hard disk drives, for programs, whether or not the programs are being executed.

The programs in memory 12 includes an operating system (OS) 16 program and application programs, such as an install program 17 or an installer tool kit. If the memory 12 is comprised of volatile and nonvolatile memory devices, then data and programs may be swapped between the volatile and nonvolatile devices in a manner known in the art.

The exemplary embodiment shown in FIG. 1 is provided solely for the purposes of explaining the invention and those skilled in the art will recognize that numerous variations are possible, both in form and function. For instance, any one or more of the following—the processor and/or memory and/or the input/output devices—could be resident on separate systems such as in a network environment. Any such variation to FIG. 1 is within the sprit and scope of the present invention. The computer system and parts thereof depicted in the figures and described below, and the Java implementations described herein, are provided solely as examples for the purposes of explanation are not intended to necessarily imply architectural limitations. Those skilled in the art will recognize the numerous programming languages which may be utilized, all of which are believed to be embraced within the spirit and scope of the invention.

Figure 2:
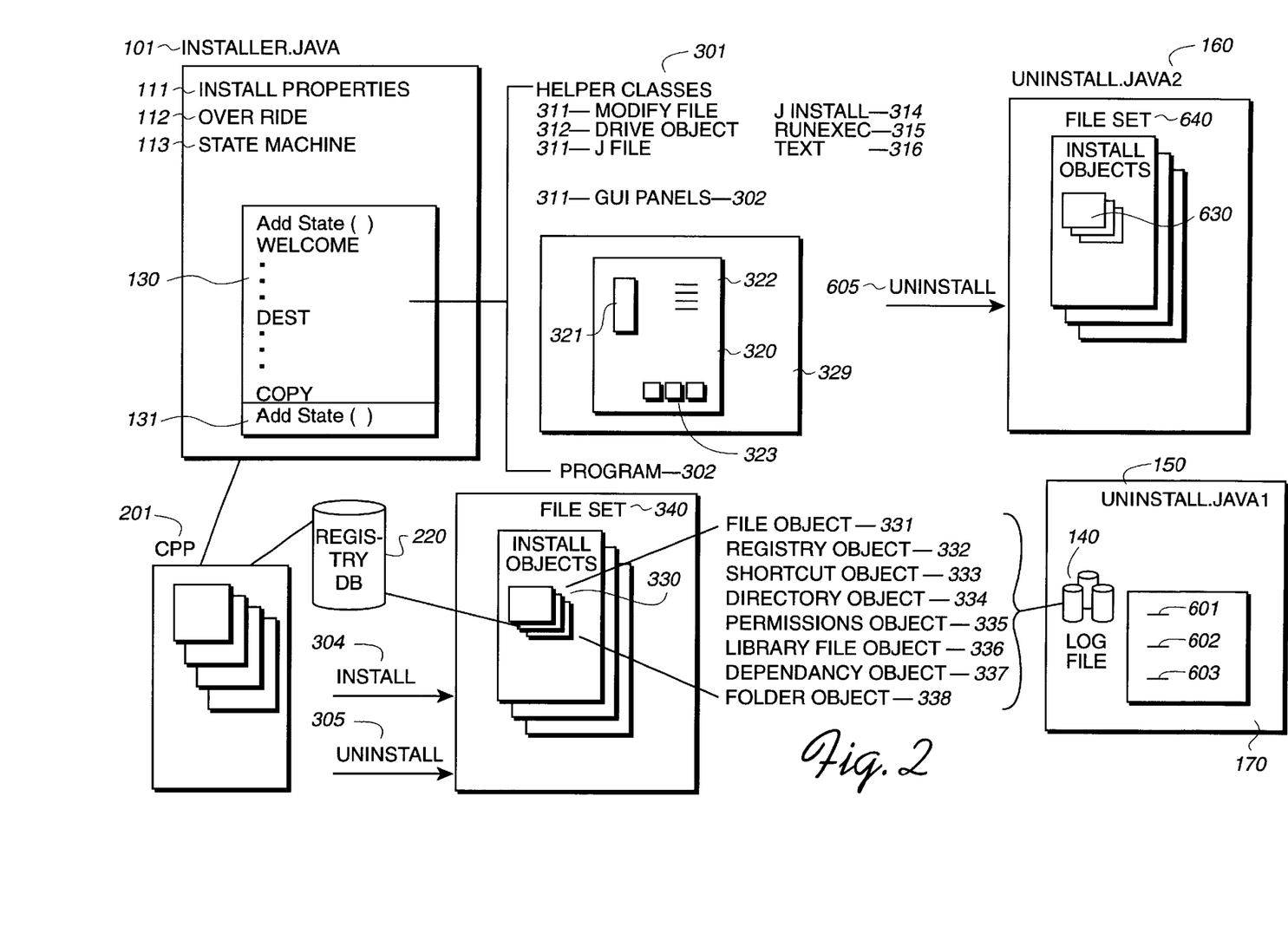
FIG. 2 is a block diagram illustrating structural components of the installer program in accordance with preferred embodiments of the present invention.

The system, method and program of a preferred embodiment of this invention enables the creation of a cross-platform installer program in accordance with the structural components and flow of FIG. 2.

A script, referred to herein as "installer.java", 101 FIG. 2, is used to run the install engine. The script implements the base installer class in Java. Within the script 101 there are the following entities: a) install properties 111; b) an override function 112; c) and a state machine 113. Within the state machine 113, there are various states 130 such as a welcome state, a destination state, a copy state, etc. This state machine includes an "add state method" 131 which is further used to check for errors. The following process takes place when the base installer class starts running: a) the properties are set up, 111, b) the properties are overridden, 112, and then c) the state machine 113 is executed. The program stays in the state machine until exited out. At exit, the program has either been successfully or unsuccessfully installed.

Within any given state 130 there are several objects. There are helper classes 301, GUI panels 302, and a program object 303.

Within the helper classes 301, there is a modify file class 311, a drive object class 312, a J file class 313, a J install class 314, a run exec class 315, and a text class 316. The modify file class 311 and drive object 312 will be discussed in more detail either below or in a related application. J file 313 is a class that enables actions to be performed with files and directories. J install 314 contains methods that enable access to environment variables and other similar activities. Run exec 315 is a class that enables the running of operating system calls. Text class 316 is a class that is used to handle national language support.

An example of a GUI panel 320 is shown in FIG. 2. There may be an image 321, text or controls 322 and buttons 323 such as back, next or cancel. The GUI panels 320 all extend a class calling a wizard dialog. They are displayed in a mainframe class 329. The mainframe class manages the screen display, e.g., gradient background color, gradient text. It also manages the splash screens and titles and other similar items including where they are being displayed. In other words, it manages the background image and screen image upon which the dialogs are displayed.

The install program further includes a program object 303 comprised of file set objects 340. Within each file set object 340 there are multiple install objects 330. There are several types of install objects—file object 331, registry object 332, shortcut object 333, directory object 334, permissions object 335, a library file object 336, a dependency object 337, and folder object 338. Other objects are also possible. All of these objects extend or implement install objects 330. In addition, all of the install objects have certain methods on each of them. In particular, each install object knows how to install or uninstall itself, how to log itself, and how to internalize from a log, i.e., how to build itself back up again from reading from a log.

The install process that the script 101 enables includes running the state machine 113 through various states 130 which cause different events to take place. For example, a GUI panel may pop up as part of the welcome state. During a destination state, another GUI panel may pop up on the screen that queries a user for the location of where to install the program. The install properties 111 may be used in the destination state by having a destination panel set a particular destination directory name of an install property to a particular directory. During the copy state, the program object 303 is built-up including all of the install objects 330. The install command 304 is then called on the program object. Each one of the file sets 340 and install objects 330 contains an install method. As such, by calling install 304 on the parent object, i.e., the program object 303, the program object goes through and calls install on all of the included file sets and install objects 340, 330.

Likewise, the uninstall process is also enabled by the script 160. For uninstall, there is an uninstall method on the file set 340 and on all of the other install objects 330. By calling uninstall 305 on the program 303, everything becomes uninstalled, i.e., the program, file sets and install objects.

It should be noted that during an install, each one of the install objects 330 is written out to a log file 140 which is put into a particular directory. At the same time that the install objects 330 log themselves to the log file, there is also another file, called "uninstall.Java1" 150 which implements a "base uninstall" class, which includes several methods that get called at different points during uninstall. During install, the log 140 and "uninstall.Java1" 150 information are built. The log file 140 and "uninstall.Java1" 150 are in the file system 170 on a particular directory. If it is uninstalled, the first thing that happens is that it reads into "uninstall.Java2" 160 the log files 140 and recreates the same structure 160 as the file sets 340 and install objects 330. It does not recreate the program object 303, but rather it recreates the structure of everything contained within the program object, i.e., file sets 640 and install objects 630. As a result, recreated from the log file 140 is a file set with all of the install objects that it contains. There is one log file for each file set. Directory 170 can be thought of as a container just like the program directory 303 is a container for the file set 340 and install objects 330.

"Uninstall.java2" 160 builds up the file sets 640. Uninstall 605 is called by the uninstaller, and it goes through each file set and install object and uninstalls itself. During the uninstall of each file set 640, the base uninstaller class 150 is called at the beginning and at the end of the file set. Therefore, at the beginning and ending of copying a file set 640, the installer makes a call to the base uninstaller class 150 at appropriate points 601, 602, 603.

There are certain platform specific operations that are taking place throughout the different objects, i.e., the helper classes 301, install objects 330, etc. Therefore, there is a platform specific module/interface. It is referred to herein as CPP 201. It defines a set of methods, that are representative of different operating systems, for functions that need to take place for an install. There are several different CPPs 211, 212, 213, . . . 219, etc., one for each operating system. For example, CPP Win 32, CPP OS/2, CPP Solaris, CPP Linux, and CPP AIX. There is also a CPP default. If the operating system is not implemented through a CPP, the CPP default is used. This CPP 201 is the platform specific code for the installer.

Since most platforms, i.e., operating systems, do not have a registry, a platform independent registry database class 220 is created which ties the platform specific code 201 with registry objects 332. The registry database 220 implements the registry function for those platforms which do not have a registry.

The installer tool kit of the preferred embodiment of this invention supports the Windows 32 operating systems including Windows 95, Windows 98 and NT 4.0. It also supports OS/2 Warp 4.0, OS390, AIX 4.1 and higher versions, Solaris and Linux 4.2. Although the structure of the preferred embodiment enables support for any given operating system or environment, future embodiments or further enhancements to the present preferred embodiment will enable full support for other operating systems such as NT 5.0, BP-UX, AS/400, or any other operating system. The installer program 17 or tool kit may be written in a script based object oriented programming language, such as Java. The developer may utilize the programming language commands to develop an install program according to the developer's specifications. In preferred embodiments, the developer may determine the program flow and the display of specific graphical user interface (GUI) panels. Furthermore, the tool kit enables a developer to perform functions on files and directories, e.g., to copy, read, create, modify, version and to batch files. With respect to registry functions, the tool kit enables a developer to write an install program that can read, create, modify, delete, and enumerate registries for the Windows operating system which is the only operating system that has a registry object. These same functions are provided for all other operating systems that do not have a registry, but do have registry equivalent functionality.

Other functions of the tool kit include i) providing install property objects that contain variables as values that become defined for a specific operating environment; ii) enabling a property value to be temporarily overridden; iii) a software state machine that enables a programmer to easily customize an install program by merely adding, deleting, or changing the various states that contain the functions and flow of control of the program; iv) automatically detecting a programming error if a programmer incorrectly specifies a non-existent state within the state machine; v) automatically selecting a system-dependent function; vi) a containment structure consisting of program object, fileset objects, install objects, where each fileset object and install object contains means to install and uninstall itself and to log itself; vii) enabling the management of folders, shortcuts and icons; viii) enabling environment variables to be read, created, modified and deleted; ix) providing dependency checking of prerequisite programs during both install and uninstall; and x) providing various logs, e.g. a log for keeping track of what is being installed, and a log that reports the progress of install. Logs are used for both the install and uninstall process. Furthermore, these logs are human readable which allows them to be checked, e.g., after a silent install, to ensure that a file has installed successfully. The tool kit also enables multiple destination directories to be installed from multiple source directories. For example, there can be multiple components of file sets included in an install where a file set is a separately installable/uninstallable piece of code or set of files.

The tool kit also enables an install program to undo an install, i.e., uninstall. In preferred embodiments, the steps of the install operation are maintained. In this way, if a second installation is performed over an initial installation, the changes made by the second installation are saved in a file. In this way, if the second installation is removed, the system may be restored to the state at the first installation using the information saved on the installation. In other words, a previous version is recovered when a latest version is uninstalled by replacing a backup of files.

Other features include a) a progress bar that shows the status during an install, b) splash screens which can be displayed during an install, c) national language support, d) the ability to perform unattended install from install scripts, and e) an install wizard. There are also twenty or so defining default panels that are available. It is also easy for a programmer to add a programmer's own panels without a lot of effort.

Preferred embodiments of the invention include a) an installer tool kit, including a system, method, and program, that enables the creation of install programs for any one of a plurality of operating systems as described herein, b) an install program that can be used for multiple platforms to install an application program on a specific operating system; i.e., the same install program can be used to install a similar application program on different operating systems, c) a method for carrying out the functions of the install program, and d) a computer system running the install program on a specific operating system for installing an application program. Other more general embodiments include a) any tool kit for enabling the creation of programs that are capable of running on more than one operating system, b) any program that is enabled for multiple platforms, c) methods carried out by cross platform programs, and d) a computer system running a program that is enabled for multiple platforms.

The above description presented an overview of the install program and how it works. The following describes, in more detail, various parts of the overall structure and process described above.

Preserving Background Settings During Installation and Uninstallation

Figure 3:
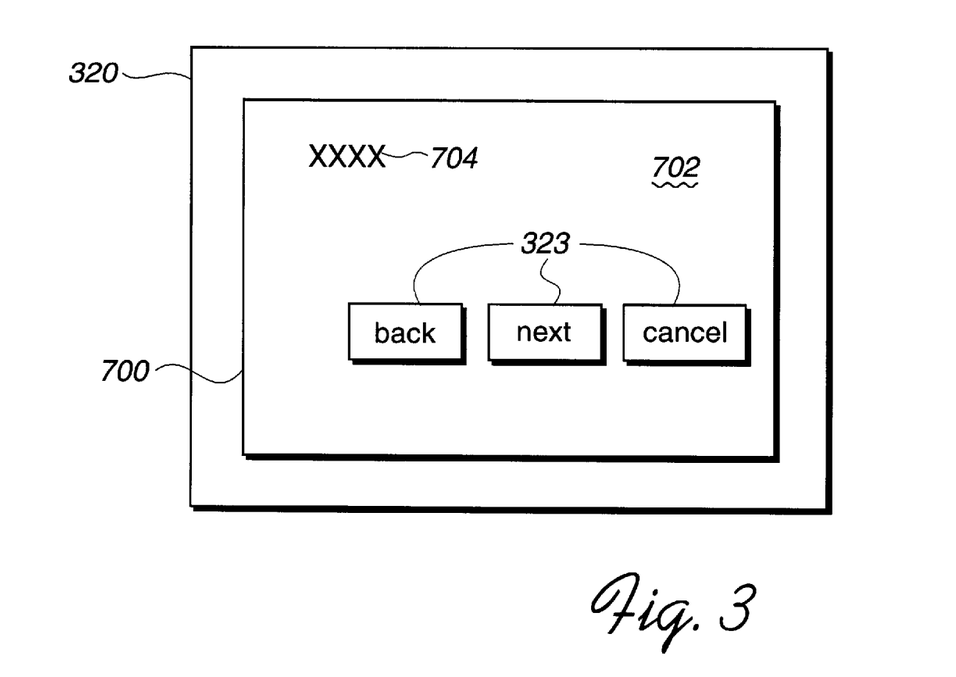
FIG. 3 illustrates an embodiment of a GUI panel according to embodiments of the present invention.

FIG. 3 illustrates an embodiment of the GUI panel 320. During the install process, the GUI panel 320 may display a background display panel 700 that includes, background color 702, background text 704 (for example, the product name), and other information such as images, logos, and the like. This background display panel 700 may cover the entire GUI panel 320 or some portion thereof. The display information needed to display the background panel 700 is preferably stored in a background display object 706. In preferred embodiments, the background display object 706 is an instance of the mainframe class 329 and a separate component object. In further embodiments, the background display object 706 may be encapsulated within another display object.

The GUI panel 320 may also display interactive panels such as buttons 323 for continuing or canceling the installation process. During each step of the installation process, the active dialog boxes 323 may appear over the background panel 700 and provide the user with the necessary instructions to complete installation. During the installation process the background panel 700 may remain constant during all installation steps or it may change during a specific installation step or between steps. In the event that the background panel 700 changes to a different background panel during installation, display information for additional different background panels may be stored in the background display object 706 or in additional background display objects.

Figure 4:
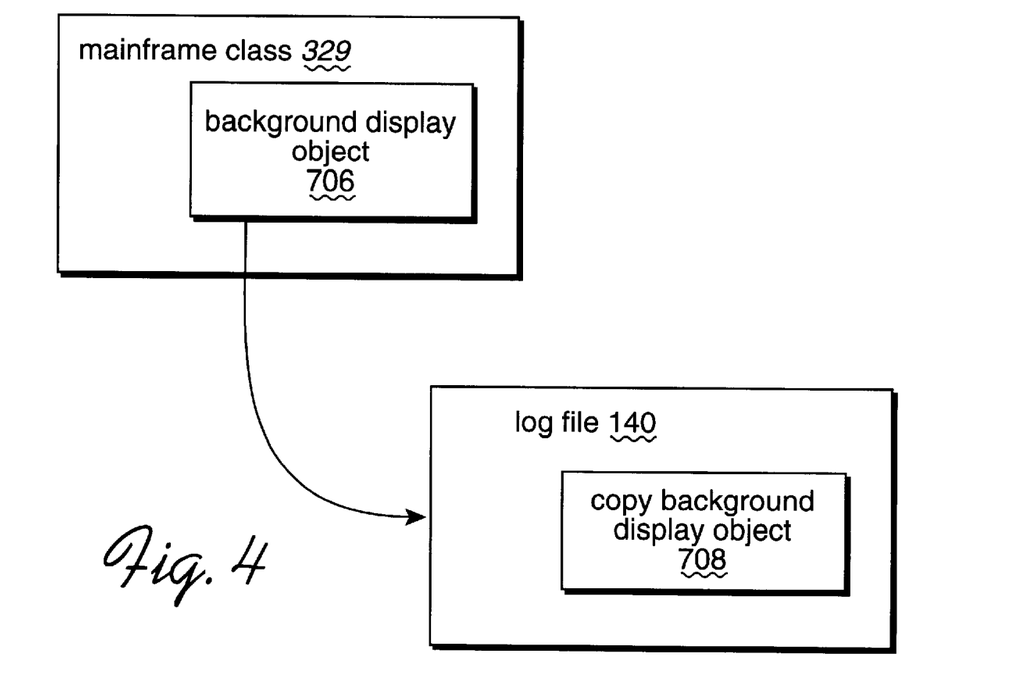
FIG. 4 illustrates a copy process occurring during installation according to a preferred embodiment of the present invention.

FIG. 4 illustrates a copy process that occurs during installation where a copy of the background display object 706 is copied to a copy background display object 708 in a log file 140, which is preferably a directory in a non-volatile memory device, such that the copy background display object 708 is maintained after the termination of the installation process. In further embodiments, the install program 17 may capture the image of the background display panel 700 and store the captured image in the copy of the background display object 708 from the display means 14.

When the user desires to uninstall the program, certain embodiments of the present invention permit the user to view the identical background information that was previously displayed during installation. As illustrated in FIG. 4, this may be accomplished by displaying the image maintained in the copy of the background display object 708 in the log file 140 to display the same background appearance.

Figure 5:
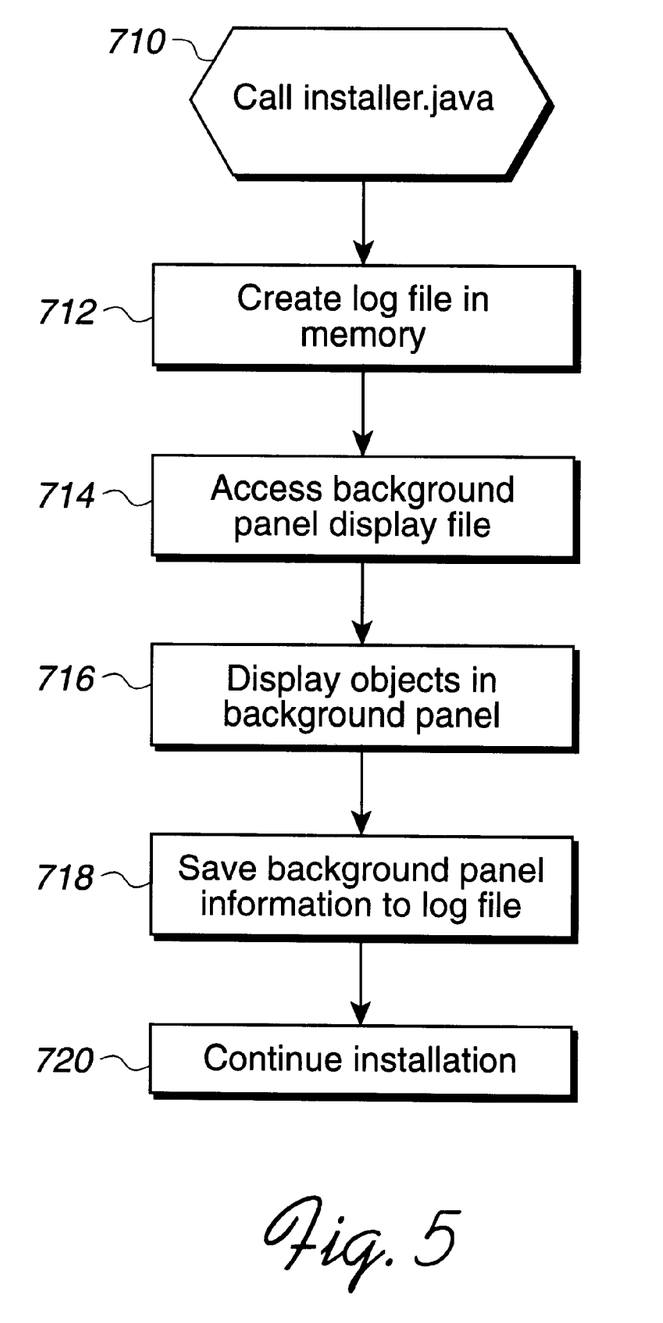
FIG. 5 illustrates logic implemented to install a program according to a preferred embodiment of the present invention.

FIG. 5 illustrates logic implemented in the install program 17 in an object oriented computer language, e.g., Java, C++, etc according to one embodiment of the present invention. Control begins at block 710 with a call to an installation script, installer.java 101, used to run the installation. Control transfers to block 712, where a log file is created in a non-volatile memory location. Control transfers to block 714, where GUI display objects, including background display file 706, which may be part of a mainframe class 329, are accessed and processed. At block 716, the image maintained in the background display object 706 is displayed as background display panel 700. At block 718, the install program 17 saves a copy 708 of the background display object 706 to the log file 140. The background display object(s) 706 are copied to 708 so that they can be accessed during an uninstall process and displayed such that the screen background panel displayed during uninstallation is the same as the background panel 700 displayed during installation. The installation process continues at block 720.

The log file (or files) 140 which store the background panel 700 in the copy background display object 708 may be the log file 140 and may be created at any time during the installation process (even at the end of installation). Preferably the log file is created at the beginning of execution of the installation program. The background display object 706 may likewise be copied to the log file 140 at any time during the installation process. Preferably, the background display object 706 is copied at the beginning of the installation process after the log file is created. Additional background display objects may also be saved if the background panel changes during installation.

Figure 6:
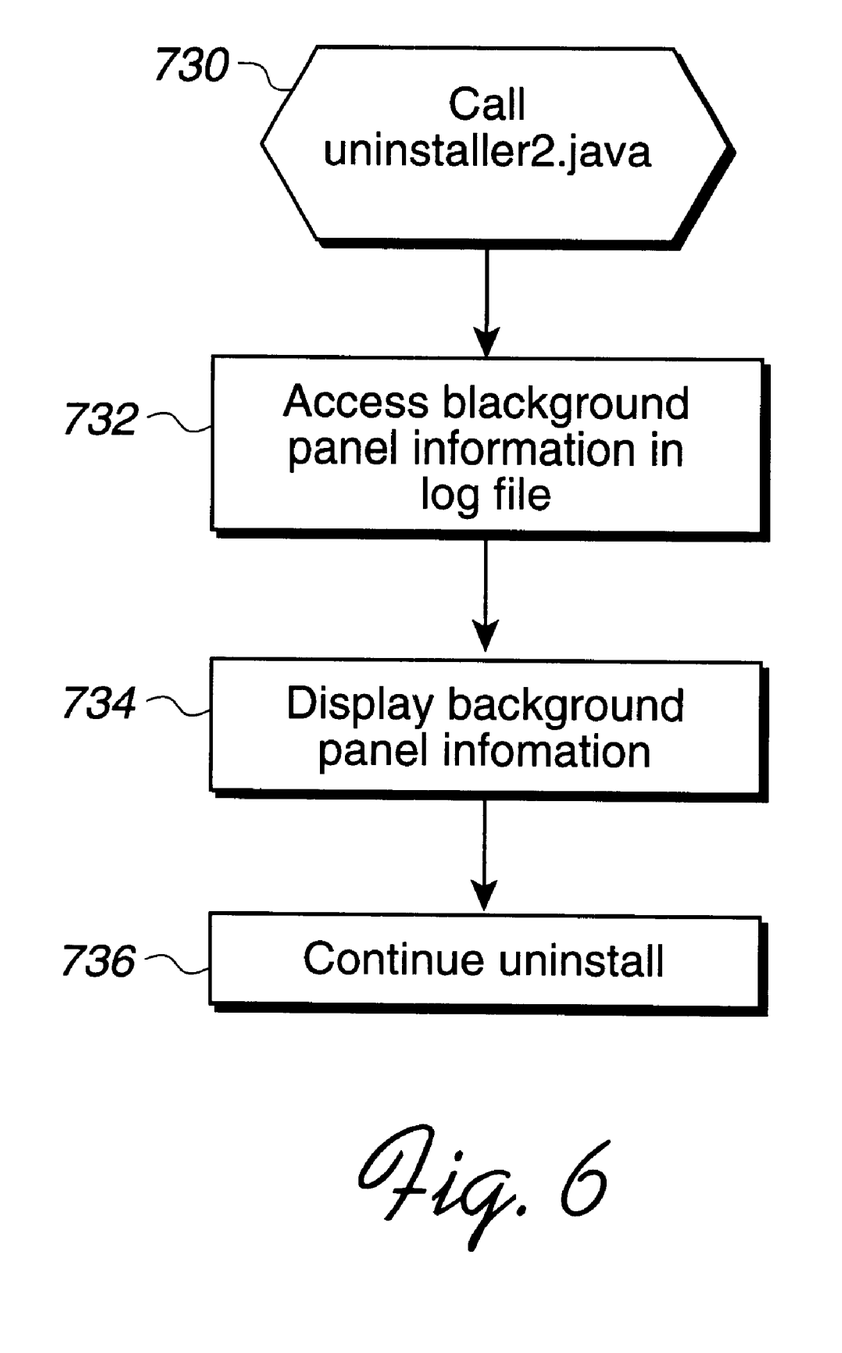
FIG. 6 illustrates logic implemented to uninstall a program according to a preferred embodiment of the present invention.

FIG. 6 illustrates logic implemented during an uninstall operation according to an embodiment of the present invention. Control begins at block 730, where the uninstaller script, uninstall.java2 160 is called to run the uninstallation of the program. Control transfers to block 732, where the log file 140 containing the copy background display object 708 is accessed. Control then transfers to block 734, where the copy background display object 708 is processed to display the background display panel 700, which is the same panel displayed during installation. The uninstall operation continues at block 736.

Embodiments of the present invention provide the user with a familiar background display when uninstalling a program because the background displayed during uninstall contains the same background information that was present during installation. This reduces the likelihood that a user would inadvertently uninstall the wrong program, because preferred embodiments allow the user, during the uninstallation process, to observe the background information for the product and confirm that the desired program is being uninstalled.

Alternative Embodiments/Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

The program flow logic described in the flowcharts above indicated certain events occurring in a certain order. Those skilled in the art will recognize that the ordering of certain programming steps or program flow may be modified without affecting the overall operation performed by the preferred embodiment logic, and such modifications are in accordance with the preferred embodiments.

Preferred embodiments of the install program 17 and install kit were described as implemented in the Java programming language. However, any other object oriented programming language or other programming language may be used to implement the install program 17 and provide the user with tools to develop an install script.

In summary, preferred embodiments disclose a method, system, program, and data structure for managing background display information being installed on a computer system. Certain embodiments include at least one file set including install objects to install a computer program. The install objects include a graphics object containing background display information relating to the program. The install objects are processed to install the computer program, and the graphics object is processed to display the background display information on a display monitor. A copy of the graphics object is stored to a non-volatile memory location, and the copy of the graphics file is maintained in the memory location after the program is installed onto the computer. Embodiments may also include a file set having uninstall objects to uninstall the computer program. The uninstall objects are processed to uninstall the computer program, and the copy of the graphics object stored in the non-volatile memory location is processed to display the background display information on the monitor during uninstall.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing background display information in a program being installed on a computer system, comprising:

storing a copy of the background display information in a memory location, wherein the copy of the background display information is maintained in the memory location after the program is installed onto the computer; and processing the copy of the background display information stored in the memory location to display the background display information during uninstall, wherein the background display information displayed during uninstall is the same background display information displayed during install.

2. A method for managing background display information in a program being installed on a computer system, comprising:

providing at least one file set including install objects to install a computer program, the install objects including a graphics object containing background display information relating to the program;

processing the install objects to install the computer program;

processing the graphics object to display the background display information on a display monitor, wherein the background display information displayed during uninstall is the same background display information displayed during install; and storing a copy of the graphics object to a memory location, wherein the copy of the graphics object is maintained in the memory location after the program is installed onto the computer.

3. A method as in claim 2, wherein the copy of the graphics object is external to the installation file set.

4. A method as in claim 2, further comprising:

providing a file set including uninstall objects to uninstall the computer program;

processing the uninstall objects to uninstall the computer program; and processing the copy of the graphics object stored in the memory location to display the background display information on the monitor during uninstall.

5. A method as in claim 2, wherein the background display information includes at least one feature selected from the group consisting of color, text, a logo, and an image.

6. A method as in claim 2, wherein said memory location comprises a non-volatile memory location.

7. A method as in claim 2, firther comprising:

creating a log file within the memory location during installation of the computer program; and storing the copy of the graphics file to the log file.

8. A method as in claim 2, further comprising displaying the background display information on the monitor during installation, wherein the graphics file is stored to the log file prior to displaying the background information on the monitor.

9. A method as in claim 2, further comprising displaying the background display information on the monitor during installation, wherein the graphics file is stored to the log file after displaying the background information on the monitor.

10. A method as in claim 9, wherein the graphics object comprises a first graphics object, wherein the install objects further comprise a second graphics object containing additional background information, and further comprising storing a copy of the second graphics object to a memory location, wherein the copy of the second graphics file is maintained in the memory location after the program is installed onto the computer.

11. A system for managing background display information in a program being installed on a computer system installing a program, comprising:

a computer including an operating system;

a computer monitor;

a memory device; and program logic executed by the computer in communication with the computer monitor and the memory device, comprising:

(i) means for storing a copy of the background display information in a memory location in the memory device, wherein the copy of the background display information is maintained in the memory location after the program is installed onto the computer; and (ii) means for processing the copy of the background display information stored in the memory location to display the background display information during uninstall, wherein the background display information displayed during uninstall is the same background display information displayed during install.

12. A system for managing background display information in a program being installed on a computer system installing a program, comprising:

a computer including an operating system;

a computer monitor;

a memory device storing at least one file set including install objects to install a computer program, the install objects including a graphics object containing background display information relating to the program; and program logic executed by the computer in communication with the computer monitor and the memory device, comprising:

(i) means for processing the install objects to install the computer program;

(ii) means for processing the graphics object to display the background display information on a display monitor, wherein the background display information displayed during uninstall is the same background display information displayed during install; and (iii) means for storing a copy of the graphics object to a memory location, in the memory device, wherein the copy of the graphics object is maintained in the memory location after the program is installed onto the computer.

13. The system of claim 12, wherein the copy of the graphics object is external to the installation file set.

14. The system of claim 12, wherein the program logic executed by the computer in communication with the computer monitor and the memory device further comprises:

means for providing a file set including uninstall objects to uninstall the computer program;

means for processing the uninstall objects to uninstall the computer program; and means for processing the copy of the graphics object stored in the memory location to display the background display information on the monitor during uninstall.

15. The system of claim 12, wherein the background display information includes at least one feature selected from the group consisting of color, text, a logo, and an image.

16. The system of claim 12, wherein said memory location comprises a non-volatile memory location.

17. The system of claim 12, wherein the program logic executed by the computer in communication with the computer monitor and the memory device further comprises:

means for creating a log file within the memory location during installation of the computer program; and means for storing the copy of the graphics file to the log file.

18. The system of claim 12, wherein the program logic executed by the computer in communication with the computer monitor and the memory device further comprises:

means for displaying the background display information on the monitor during installation, wherein the graphics file is stored to the log file prior to displaying the background information on the monitor.

19. The system of claims 12, wherein the program logic executed by the computer in communication with the computer monitor and the memory device further comprises:

means for displaying the background display information on the monitor during installation, wherein the graphics file is stored to the log file after displaying the background information on the monitor.

20. The system of claim 19, wherein the graphics object comprises a first graphics object, and wherein the install objects further comprise a second graphics object containing additional background information; and wherein the program logic executed by the computer in communication with the computer monitor and the memory device further comprises means for storing a copy of the second graphics object to a memory location, wherein the copy of the second graphics file is maintained in the memory location after the program is installed onto the computer.

21. An article of manufacture for use in managing background display information in a program being installed on a computer system, the article of manufacture comprising computer useable media accessible to the computer system, wherein the computer usable media includes at least one computer program that is capable of causing the computer system to perform:

storing a copy of the background display information in a memory location, wherein the copy of the background display information is maintained in the memory location after the program is installed onto the computer; and processing the copy of the background display information stored in the memory location to display the background display information during uninstall, wherein the background display information displayed during uninstall is the same background display information displayed during install.

22. An article of manufacture for use in managing background display information in a program being installed on a computer system, the article of manufacture comprising computer useable media accessible to the computer system, wherein the computer usable media includes at least one computer program that is capable of causing the computer system to perform:

providing at least one file set including install objects to install a computer program, the install objects including a graphics object containing background display information relating to the program;

processing the install objects to install the computer program;

processing the graphics object to display the background display information on a display monitor, wherein the background display information displayed during uninstall is the same background display information displayed during install; and storing a copy of the graphics object to a memory location, wherein the copy of the graphics object is maintained in the memory location after the program is installed onto the computer.

23. An article of manufacture as in claim 22, wherein the copy of the graphics object is external to the installation file set.

24. An article of manufacture as in claim 22, further capable of causing the computer system to perform:

providing a file set including uninstall objects to uninstall the computer program;

processing the uninstall objects to uninstall the computer program; and processing the copy of the graphics object stored in the memory location to display the background display information on the monitor during uninstall.

25. An article of manufacture as in claim 22, wherein the background display information includes at least one feature selected from the group consisting of color, text, a logo, and an image.

26. An article of manufacture as in claim 22, wherein said memory location comprises a non-volatile memory location.

27. An article of manufacture as in claim 22, further capable of causing the computer system to perform:

creating a log file within the memory location during installation of the computer program; and storing the copy of the graphics file to the log file.

28. An article of manufacture as in claim 22, further capable of causing the computer system to display the background display information on the monitor during installation, wherein the graphics file is stored to the log file prior to displaying the background information on the monitor.

29. An article of manufacture as in claim 22, further capable of causing the computer system to display the background display information on the monitor during installation, wherein the graphics file is stored to the log file after displaying the background information on the monitor.

30. An article of manufacture as in claim 29, wherein the graphics object comprises a first graphics object, and wherein the install objects further comprise a second graphics object containing additional background information, and further capable of causing the computer system to perform storing a copy of the second graphics object to a memory location, wherein the copy of the second graphics file is maintained in the memory location after the program is installed onto the computer.

* * * * *

UNITED STATES PATENT AND TRADEMARK OFFICE
CERTIFICATE OF CORRECTION

PATENT NO.   : 6,360,365 B1
DATED        : March 19, 2002
INVENTOR(S)  : Bryce Allen Curtis It is certified that error appears in the above-identified patent and that said Letters Patent is hereby corrected as shown below:

<u>Column 11,</u>
Line 64, delete "firther" and insert -- further --.

<u>Column 12,</u>
Line 59, delete the first ",".

<u>Column 13,</u>
Line 30, delete "claims" and insert -- claim --.

Signed and Sealed this

Fifth Day of August, 2003

JAMES E. ROGAN
*Director of the United States Patent and Trademark Office*